(12) United States Patent
Causse et al.

(10) Patent No.: US 10,541,060 B2
(45) Date of Patent: Jan. 21, 2020

(54) INORGANIC CELLULAR MONOBLOC CATION-EXCHANGE MATERIALS, THE PREPARATION METHOD THEREOF, AND SEPARATION METHOD USING SAME

(71) Applicant: COMMISSARIAT A L'ENERGIE ATOMIQUE ET AUX ENERGIES ALTERNATIVES, Paris (FR)

(72) Inventors: Jeremy Causse, Pujaut (FR); Agnes Grandjean, Saint Marcel de Careiret (FR); Alexei Tokarev, Bagnols sur Ceze (FR); Yves Barre, Uchaud (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 426 days.

(21) Appl. No.: 15/106,089

(22) PCT Filed: Dec. 17, 2014

(86) PCT No.: PCT/EP2014/078275
§ 371 (c)(1),
(2) Date: Jun. 17, 2016

(87) PCT Pub. No.: WO2015/091677
PCT Pub. Date: Jun. 25, 2015

(65) Prior Publication Data
US 2016/0318012 A1    Nov. 3, 2016

(30) Foreign Application Priority Data

Dec. 20, 2013 (FR) ...................................... 13 63329

(51) Int. Cl.
*G21F 9/12* (2006.01)
*C04B 38/00* (2006.01)
(Continued)

(52) U.S. Cl.
CPC ................ *G21F 9/12* (2013.01); *B01J 39/02* (2013.01); *B01J 39/10* (2013.01); *C02F 1/42* (2013.01);
(Continued)

(58) Field of Classification Search
CPC .. G21F 9/12; B01J 47/018; B01J 39/09; B01J 39/02; B01J 39/10; C02F 1/42
See application file for complete search history.

(56) References Cited

U.S. PATENT DOCUMENTS 5,935,380 A * 8/1999 White ...................... B01J 20/04
159/48.1
2010/0273642 A1    10/2010 Chang et al.
(Continued)

FOREIGN PATENT DOCUMENTS

EP        2152414        11/2008
EP    2 546 841 A1     1/2013
(Continued)

OTHER PUBLICATIONS

Turgis et al (An Original "Click and Bind" Approach for Immobilizing Copper Hexacyanoferrate Nanoparticles on Mesoporous Silica, Chem Mater. (2013), 25, 4447-4453) (Year: 2013).*
(Continued)

*Primary Examiner* — Melvin C. Mayes
*Assistant Examiner* — Michael Forrest
(74) *Attorney, Agent, or Firm* — Oblon, McClelland, Maier & Neustadt, L.L.P.

(57) ABSTRACT

A material in the form of an alveolar monolith consisting of a matrix of an inorganic oxide with a hierarchical and opened porosity comprising macropores, mesopores and micropores, said macropores, mesopores and micropores being interconnected, and nanoparticles of at least one metal cation exchange inorganic solid material being distributed in said porosity.

(Continued)

A

B

C

A method for preparing this material and a method for separating a metal cation notably a cation of a radioactive isotope of a metal such as cesium using this material.

22 Claims, 5 Drawing Sheets

(51) Int. Cl.
    *B01J 39/02*     (2006.01)
    *B01J 39/10*     (2006.01)
    *C02F 1/42*     (2006.01)
    *B01J 39/09*     (2017.01)
    *B01J 47/018*     (2017.01)
    *C04B 111/00*     (2006.01)
    *C02F 101/00*     (2006.01)
    *C02F 103/34*     (2006.01)

(52) U.S. Cl.
    CPC .. *C02F 2001/425* (2013.01); *C02F 2101/006* (2013.01); *C02F 2103/34* (2013.01)

(56) References Cited

U.S. PATENT DOCUMENTS

| | | | | |
|---|---|---|---|---|
| 2011/0293941 A1* | 12/2011 | Chaumonnot | ........ | C01B 37/00 428/404 |
| 2012/0125856 A1 | 5/2012 | Grandjean et al. | | |
| 2012/0196337 A1* | 8/2012 | Brun | ........ | C11C 1/045 435/134 |
| 2013/0062286 A1 | 3/2013 | Ruiz Hitzky et al. | | |
| 2013/0098840 A1* | 4/2013 | Helferich | ........ | C02F 1/281 210/670 |

FOREIGN PATENT DOCUMENTS

| | | | | |
|---|---|---|---|---|
| JP | 59-87050 | 5/1984 | | |
| JP | 2010-527890 | 8/2010 | | |
| JP | 2012-527344 | 11/2012 | | |
| RU | 2008 125 922 A | 12/2009 | | |
| WO | 01/47855 A1 | 7/2001 | | |
| WO | 2008/031108 A2 | 3/2008 | | |
| WO | WO-2008057382 A2 * | 5/2008 | | |
| WO | 2008/129151 A2 | 10/2008 | | |
| WO | WO 2008/143385 | 11/2008 | | |
| WO | WO 2010/133689 | 11/2010 | | |
| WO | WO-2011004111 A1 * | 10/2011 | ........ | C11C 1/045 |
| WO | 2012/049412 A1 | 4/2012 | | |

OTHER PUBLICATIONS

International Search Report dated Mar. 5, 2015 in PCT/EP2014/078275 filed Dec. 17, 2014.
French Search Report dated Aug. 25, 2014 in FR 1363329 filed Dec. 20, 2013.
Office Action dated Aug. 7, 2018, in Japanese patent application No. 2016-539212 (English translation only) 7 pages.
Office Action dated Feb. 12, 2019, in Japanese patent application No. 2016-539212 (English translation only) 9 pages.

* cited by examiner

INORGANIC CELLULAR MONOBLOC CATION-EXCHANGE MATERIALS, THE PREPARATION METHOD THEREOF, AND SEPARATION METHOD USING SAME

TECHNICAL FIELD

The invention relates to a cation exchange alveolar (cellular) inorganic monolithic material.

More specifically, the invention relates to a material in the form of a alveolar monolith consisting of a matrix made of an inorganic oxide with a hierarchical, opened and interconnected porosity, and nanoparticles of at least one inorganic solid material exchanging a metal cation such as a hexa- or octa-cyanometallate of a metal being distributed in said porosity.

The invention also relates to the method for preparing said material.

The present invention also relates to a method for separating metal cations, notably radioactive ones, contained in a liquid applying said material.

The technical field of the invention may generally be defined as that of treatment of liquid effluents and notably as the one of the treatment of radioactive liquid effluents, notably with a view to removing the metal cations, such as cesium cations therefrom.

STATE OF THE PRIOR ART

Nuclear facilities such as power reactors, plants for re-processing used nuclear fuel, laboratories, research centers and stations for processing liquid effluents, generate radioactive liquid effluents.

These effluents, the volumes of which are considerable, should be processed and decontaminated before their being discarded into the environment.

The pollutants which these effluents contain and which therefore have to be removed are mainly solid particles and radio-elements essentially present as metal cations in solution.

Industrial methods for decontaminating the liquid effluents, and notably radioactive liquid effluents, are however not very numerous because of the complex composition of said effluents, of their high ionic force, and also of the large variety of pH values which they may exhibit.

Presently the most widespread treatments within the scope of decontamination of liquid effluents are evaporation and chemical treatment by co-precipitation.

Thus, the first step of a method for decontaminating liquid solutions, notably not very concentrated radioactive liquid solutions, at an industrial scale, generally consists of achieving evaporation of these solutions in order to concentrate the whole of the ions present in the latter as a solid waste, which therefore becomes a residue of the decontamination process.

Nevertheless, this evaporation treatment cannot be contemplated for saline effluents since scaling of the facility then occurs.

Further, the presence of certain ions in the liquid effluents generates hot corrosion during the evaporation treatment.

In the case of strongly saline radioactive effluents, another possible treatment is the chemical treatment by coprecipitation or entrainment which is a treatment with a phase transition. The idea is to transfer the radio-elements present in a liquid phase to a solid phase either by coprecipitation or by entrainment from solid particles.

These solid particles are then rich in radio-elements and are then recovered by filtration or decantation before being confined in an adequate matrix.

These coprecipitation (for example with barium sulfate for extracting $^{90}$Sr) or entrainment (from particles of potassium nickel-hexacyanoferrate for $^{137}$Cs) processes have a certain number of drawbacks.

First of all, the formed mud volumes are consequent and may pose problems of compatibility with the materials presently used for confining industrial wastes such as glass or cement matrices. Further, the coprecipitation agents are often sensitive to the chemical composition and to the ionic force of the effluent, which causes a significant drop in the selectivity and therefore an increase in the volume of wastes.

In order to overcome the drawbacks listed above of the processing, decontamination processes of liquid effluents, many researchers and industrialists notably in the nuclear industry are presently searching for other routes for processing these effluents.

One of the studied solutions is the use of ion exchange inorganic materials, or more exactly cation exchange inorganic materials which have great selectivity for the ions to be extracted. There exists a very vast literature on the different selective inorganic ion exchange materials for $^{90}$Sr, $^{137}$Cs, or $^{60}$Co, the majority of the studies relate to tests carried out batch wise and applying exchange materials as powders. Indeed, the inorganic ion exchange materials presently used for sorbing elements to be decontaminated essentially appear as relatively fine powders, having grain sizes of the order of one micrometer, which are not compatible with a continuously applied process.

These powders, when they are used in a continuously applied process, notably in columns, may cause a strong pressure drop in these columns, which may go as far as their clogging, blocking and to stopping the facility.

If the inorganic ion exchange materials are used no longer as loose powders but as bulky, compact powders, the fouling problems are of course then avoided, but the micron size implies a low adsorption capability since the adsorption takes place at the surface.

Therefore there exists, as regards the foregoing, a need for an ion exchange inorganic solid material, more exactly for a exchange inorganic material which is compatible with continuous application in a method for separating a metal cation from a liquid medium, and which has a high adsorption capacity.

In particular, this ion exchange inorganic solid material should be chemically and mechanically stable so as to be thereby conditioned in a column allowing continuous application without there occurring blocking, clogging phenomena.

This ion exchange inorganic solid material should also have excellent binding properties, in particular for decontamination, i.e. like, or even notably superior to those of an ion exchange inorganic material in the form of loose powders.

The ion exchange inorganic material should also associate good mechanical stability with high reaction rate unlike the products in a compact form, for which the low specific surface area leads to slow reaction rates.

In other words, this ion exchange inorganic solid material should have inter alia excellent mechanical and chemical stabilities, a strong affinity or decontamination coefficient, a large reactivity, as well as good selectivity.

These properties should be obtained with a minimum amount of ion exchange inorganic solid material.

Further, in particular in the case of the fixation of radioactive elements, the ion exchange inorganic solid material should be able to be easily stored and/or vitrified without any risk by known methods.

Finally, the material should have a composition and properties which are perfectly reproducible and controlled, and should be prepared by a reliable method.

The goal of the present invention is to provide an ion exchange inorganic solid material which inter alia meets these needs.

The goal of the present invention is further to provide an ion exchange inorganic solid material which does not have the drawbacks, defects, disadvantages and limitations of ion exchange inorganic solid materials of the prior art, notably as loose or compact powders, and which overcomes the problems of the materials of the prior art.

SUMMARY OF THE INVENTION

This goal, and further other ones are achieved, according to the invention by a solid material in the form of an alveolar monolith consisting of a matrix made of an inorganic oxide with a hierarchical and opened porosity comprising macropores, mesopores and micropores, said macropores, mesopores and micropores being interconnected, and nanoparticles of at least one metal cation exchange inorganic solid material being distributed in said porosity.

The material according to the invention is fundamentally distinguished from the materials of the prior art in that it appears in the specific form, shape of an alveolar monolith, in that this monolith has a hierarchical porosity associating three types of pores, i.e. macropores, mesopores and micropores, and finally in that nanoparticles of a specific material which is a metal cation exchange inorganic solid material are distributed in this porosity.

The material according to the invention meets the needs listed above, it does not have the drawbacks of the materials of the prior art and it provides a solution to the problems posed by the materials of the prior art.

Thus, in the case of a method for processing effluents in a column, the material according to the invention which appears in the specific form of an alveolar monolith with a hierarchical porosity, has the advantage of strongly reducing the pressure drop as compared with a material consisting of a compact stack of particles.

The material according to the invention allows therefore limitation of the risk of blocking the processing system, such as a column, due to the production of fine particles within the bed of particles.

The fact that the material according to the invention is in the form of a monolith gives it great strength and great mechanical stability, while the fact that the monolith is mainly consisting of an inorganic oxide gives it great chemical resistance and consequently ensures the processing of a large variety of effluents.

Further, the presence of the metal cation exchange inorganic solid material in the form of nanoparticles distributed in the porosity of the monolith strongly increases the amount of metal cations which may be absorbed as compared with a cation exchange inorganic solid material which is in a massive bulky form.

This is explained by the fact that when the cation exchanger (cation exchange material) is in a nanometric form, the available specific surface area for the metal cations, such as cesium cations, is higher.

Monoliths with a hierarchical porosity are commercially available. These are exclusively silica monoliths.

The incorporation of cation exchange nanoparticles in such monoliths has however never been described or suggested, the same applies to their use for removing cations from a liquid effluent, in particular for decontaminating complex effluents containing different radio-elements.

Further it should be noted that regarding clays and zeolites, the clays and zeolites do not have a hierarchical porosity. Indeed, the size of the pores of zeolites is monodispersed, generally of a few angstroms, corresponding to the size of the crystalline cage; and for clays, which are layered materials, there is also a single pore size, of the order of a nm.

Many documents mention the functionalization of inorganic monoliths with chemical functions covalently bound to the material. Therefore this is not the incorporation of nanoparticles and even less of nanoparticles of a cation exchanger in the porosity of monoliths.

For example, document WO-A1-2001/47855 [1] shows the functionalization of a silica monolith with a silane with the purpose of more efficiently producing molecules of the ketene type. In this case, the silane is therefore bound to the silica lattice by post-functionalization.

Also, document WO-A2-2008/031108 [2] discloses a list of precursors of the silane type intended for functionalization of pre-synthesized porous silicas. The targeted applications are diverse and depend on the type of considered silane.

Moreover, a method for synthesizing monoliths is known, which was developed by the group of R. BACKOV of the Paul Pascal Research Centre in Bordeaux.

This method consists of preparing a direct oil-in-water emulsion containing a majority of oil by volume. A silica precursor dissolved beforehand in an aqueous phase reacts in order to form an inorganic network surrounding the oil drops. The oil phase is then removed by rinsing, which releases the macroporosity of the material. In order to stabilize the water/oil interface, surfactants are required.

These surfactants may be either molecular organic surfactants or colloidal particles.

The method using molecular organic surfactants was the subject of application WO-A2-2008129151 [3]. It gives the possibility of obtaining a material in the form of an alveolar solid monolith consisting of a polymer of an inorganic oxide bearing organic groups, which has a hierarchical porosity with macropores, mesopores and micropores, interconnected with each other. More specifically, this method consists of preparing an emulsion by adding an oil phase to an aqueous solution of surfactant, of adding to the aqueous surfactant solution at least one tetra-alkoxide precursor of the inorganic oxide polymer, before or after the preparation of the emulsion, the reaction mixture is left at rest until condensation of the precursor, and then the mixture is dried in order to obtain a monolith. At least one alkoxide bears an organic group.

There is no mention nor any suggestion in this document of the incorporation of nanoparticles and even less of cation exchange nanoparticles, in such monoliths. In the same way, the use of these monoliths for removing cations from a liquid effluent, in particular for removing cations of radio-elements from radioactive effluents, is neither described nor suggested in this document.

The method using colloidal solid particles was the subject of the application WO-A2-2012/049412 [4]. It gives the possibility of obtaining a purely macroporous, monodispersed material and not a material with a hierarchical porosity.

More specifically, this method comprises at least one step for mineralizing an oil-in-water emulsion, formed of droplets of an oily phase dispersed in a continuous aqueous phase, and wherein colloidal solid particles are present at the interface formed between the continuous aqueous phase and the droplets of the oily phase.

The colloidal solid particles may be mineral or organic.

There is no mention nor any suggestion in this document that the colloidal solid particles may be cation exchange nanoparticles. In the same way, the use of the monoliths of this document for removing cations from a liquid effluent, in particular for removing cations of radio-elements from radioactive effluents is neither disclosed nor suggested.

The role of the colloidal particles in this document is exclusively the stabilization of the emulsion, more exactly the water-oil interface of the emulsion, in order to induce a monodispersed macroporosity of the material.

Indeed, the macroporosity of the material, directly results from the size of the drops of the emulsion. As the size of the drops of the emulsion is monodispersed, the macroporosity of the material is also accordingly highly monodispersed.

The role of the particles in this document is by no means to functionalize the monolith in order to give it cation exchange properties, and notably of a selective adsorbent properties of certain cations.

The aim of the material according to the invention which is to functionalize the monoliths with these nanoparticles, is neither mentioned nor suggested in this document where the role of the colloidal particles is only to stabilize the emulsion, and by no means to make the monolith reactive with a view to its use for removing cations from a solution.

According to the invention, the single and unique role of the nanoparticles used is to functionalize the monolith, and not to stabilize the emulsion applied during the preparation of the material, as this will be seen later on in the description of the method for preparing the material according to the invention.

Indeed, the cation exchange nanoparticles, notably those of ferrocyanides used alone, do not allow stabilization of the emulsion and preparation of the monolith. This is why in the method according to the invention, a surfactant is needed, in addition to the nanoparticles, for stabilizing the emulsion.

In the sense of the present invention, by monolith is meant a solid object for the average dimension is of at least 1 mm.

In the sense of the present invention, by macropores are meant pores for which the average dimension, generally defined by the diameter of their cross-section, since the pores have generally a circular cross-section, from 4 µm to 50 µm; by mesopores are meant pores for which the average dimension is from 20 to 500 Å, preferably from 20 to 300 Å; and by micropores are meant pores for which the average dimension is less than 20 Å, for example is from 5 to 10 Å.

Advantageously, the inorganic oxide is selected from the oxides of at least one metal or metalloid selected from Si, Ti, Zr, Th, Nb, Ta, V, W, Y, Ca, Mg and Al.

Preferably, the inorganic oxide is silica.

The metal cation exchange inorganic solid material may be selected from all the metal cation exchange inorganic solid materials known to the man skilled in the art.

This exchange material is selected according to the targeted application, to the nature of the liquid effluent to be processed, and notably depending on the metal cation(s) for which separation is intended.

Advantageously, the metal cation exchange inorganic solid material is selected from metal hexa- and octa-cyanometallates, for example of formula $[Alk^+_x]M^{n+}_y[M'(CN)_m]_t^{z-}$, wherein Alk is a monovalent cation selected from cations of alkali metals and the ammonium cation $NH_4^+$, x is 0, 1 or 2, M is a transition metal, n is 2 or 3, y is 1, 2 or 3, M' is a transition metal, m is 6 or 8, z is 3 or 4, and t is 1, or 2.

Advantageously, $M^{n+}$ is $Fe^{2+}$, $Ni^{2+}$, $Fe^{3+}$, $Co^{2+}$, $Cu^{2+}$, or $Zn^{2+}$.

Advantageously, M' is $Fe^{2+}$ or $Fe^{3+}$ or $Co^{3+}$ and m is 6; or else M' is $Mo^{5+}$ and m is 8.

Advantageously, $[M'(CN)_m]^{z-}$ is $[Fe(CN)_6]^{3-}$, $[Fe(CN)_6]^{4-}$, $[Co(CN)_6]^{3-}$ or $[Mo(CN)_8]^{3-}$.

Preferably, the metal cation exchange inorganic solid material has the formula $[K^+_x]Cu^{2+}_y[Fe(CN)_6]^{z-}$, for example $K_2Cu\,Fe(CN)_6$.

Indeed, one of the main applications targeted for the materials according to the invention is that of sorbents of radioactive cesium for nuclear decontamination needs.

Now, the nanoparticles of copper ferrocyanides (and ferricyanides) (FCCu) of general formula $[K^+_x]Cu^{2+}_y[Fe(CN)_6]^{z-}$, for example $K_2Cu\,Fe(CN)_6$ are highly selective for cesium. Their crystalline structure is face-centered cubic, and has the advantage of being able to selectively exchange a cesium atom with an unbound potassium atom, present in the unit cell.

Generally, the nanoparticles are sphere- or spheroid shaped.

Generally, the nanoparticles have an average size, such as a diameter from 2 to 300 nm, preferably from 2 to 100 nm, still preferably from 2 to 50 nm.

Generally, the nanoparticle content of said at least one metal cation exchange inorganic solid material is from 0.5 to 15% by weight, preferably from 0.5 to 5% by weight.

Further, the invention relates to a method for preparing the material according to the invention which comprises at least the following steps:

a) a colloidal aqueous suspension of nanoparticles of at least one metal cation exchange inorganic solid material is prepared;

b) an aqueous solution containing an organic surfactant and a precursor of the inorganic oxide is prepared;

c) the colloidal aqueous suspension prepared in step a) is mixed with the aqueous solution prepared in step b);

d) an oily phase is added, with mechanical stirring under shearing, to the aqueous solution prepared in step c), whereby an oil-in-water emulsion is obtained formed with droplets of the oily phase dispersed in a continuous aqueous phase and wherein the nanoparticles of said at least one metal cation exchange inorganic solid material are present at the interface formed between the continuous aqueous phase and the droplets of the dispersed oily phase.

e) the ripening, mineralization of the emulsion obtained in step d) is carried out, whereby the monolith is formed and the material according to the invention is obtained.

As already discussed above, according to the invention, the single and unique role of the nanoparticles used is to functionalize the monolith and not to stabilize the emulsion applied during the preparation of the material, as this is the case in the method described in document [4]. Indeed, the cation exchange nanoparticles, notably of ferrocyanides used alone do not allow stabilization of the emulsion and preparation of the monolith. This is why in the method for preparing the material according to the invention, a molecular, organic surfactant is needed in addition to the nanoparticles for stabilizing the emulsion, unlike the method described in document [4].

Generally, the colloidal aqueous suspension of nanoparticles prepared in step a), has a nanoparticles concentration from 1 g/L to 50 g/L, preferably from 9 g/L to 32 g/L, and its pH is generally from 5 to 6.

The nanoparticles concentration in the aqueous colloidal suspension is selected according to the final nanoparticles concentration in the monolithic solid material.

In the case when the metal cation exchange inorganic solid material is a ferrocyanide of formula $[K^+_x]Cu^{2+}_y[Fe(CN)_6]^{z-}$, for example $K_2Cu\ Fe(CN)_6$, the colloidal solutions of these compounds may be prepared by mixing an aqueous solution of $K_4Fe(CN)_6$ with an aqueous solution of a copper salt such as copper nitrate. This preparation technique is advantageous since it promotes the synthesis of not very monodispersed ferrocyanide nanoparticles with average sizes generally comprised between 10 nm and 20 nm. This preparation technique, by mixing two aqueous solutions, of the colloidal aqueous suspension of the metal cation exchange inorganic solid material, is not limited to ferrocyanides of formula $[K^+_x]Cu^{2+}_y[Fe(CN)_6]^{z-}$, for example $K_2Cu\ Fe(CN)_6$, and may be applied to any kinds of cation exchange materials and notably to the metal hexa- and octa-cyanometallates, for example of formula $[Alk^+_x]M^{n+}_y[M'(CN)_m]_t^{z-}$, as discussed above.

The aqueous solution containing an organic surfactant and a precursor of the inorganic oxide is generally prepared by adding the precursor, generally liquid, to a solution of the organic surfactant.

The solution of the organic surfactant may generally have a concentration from 10 to 30% by weight, for example 20% by weight.

This solution may have a pH close to 2, for example from 1.5 to 2.5, notably from 1.8 to 2.2, when the metal cation exchange inorganic solid material is a metal hexa- or octa-cyanometallate, for example of formula $[Alk^+_x]M^{n+}_y[M'(CN)_m]_t^{z-}$ discussed above, such as a ferrocyanide of formula $[K^+_x]Cu^{2+}_y[Fe(CN)_6]^{z-}$ like $K_2Cu\ Fe(CN)_6$.

The pH may be adjusted to the desired value by means of a mineral or organic acid, preferably selected from hydrochloric acid, nitric acid or sulfuric acid.

The organic surfactant is preferably selected from cationic and non-ionic surfactants, such as the Pluronics like Pluronic P 123 marketed by BASF or SIGMA-ALDRICH.

The inorganic oxide is generally selected from metal and metalloid oxides, and the precursor of this oxide is generally selected from metal or metalloid alkoxides, and metal or metalloid salts, such as metal and metalloid chlorides and nitrates.

In the case when the inorganic oxide is silica, the precursor(s) of silica may be selected from tetramethoxyorthosilane (TMOS), tetraethoxyorthosilane (TEOS), dimethyldiethoxysilane (DMDES), and mixtures thereof.

The concentration of the surfactant in the aqueous solution prepared in step b) is generally from 10% to 30% by weight, and the concentration of the precursor is generally from 1 to 500 g/L.

The pH of the aqueous solution prepared in step b) may be close to 2, for example from 1.5 to 2.5, notably from 1.8 to 2.2.

During step c), a volume of the aqueous suspension (which may optionally be also called a solution) prepared in step a) (i.e. the colloidal aqueous suspension of nanoparticles of at least one metal cation exchange inorganic solid material), is mixed with a volume of the aqueous solution prepared in step b) (i.e. the aqueous solution containing an organic surfactant and a precursor of the inorganic oxide).

This mixture is made according to a volume ratio R, defined by the following relationship:

$R$=Volume of the aqueous suspension prepared in step $a$)/volume of the aqueous solution prepared in step $b$).

The ratio R may vary from 0 to 2, preferably from 0.1 to 2, still preferably from 0 to 1, better from 0.1 to 1.

At the end of step c), and before step d), when the metal cation exchange inorganic solid material is a metal hexa- or octa-cyanometallate, for example of formula $[Alk^+_x]M^{n+}_y[M'(CN)_m]_t^{z-}$ discussed above, such as a ferrocyanide of formula $[K^+_x]Cu^{2+}_y[Fe(CN)_6]^{z-}$, like $K_2Cu\ Fe(CN)_6$, the pH of the solution, obtained in step c) is adjusted to the vicinity of 2 (for example from 1.5 to 2.5, notably from 1.8 to 2.2), and a step c1) is further carried out during which an aqueous solution of at least one metal fluoride, preferably of at least one alkali metal fluoride such as KF, LiF, or NaF is added to the solution obtained in step c).

Sodium fluoride is generally used.

The step c1) is carried out when the metal cation exchange inorganic solid material is a metal hexa- or octa-cyanometallate, for example of formula $[Alk^+_x]M^{n+}_y[M'(CN)_m]_t^{z-}$ discussed above, such as a ferrocyanide of formula $[K^+_x]Cu^{2+}_y[Fe(CN)_6]^{z-}$ like $K_2Cu\ Fe(CN)_6$.

Indeed, in the applications [3] and [4] mentioned above, the pH for preparing the materials, or rather the pH of the applied aqueous phases, and notably of the aqueous phase of the emulsion is close to 0. Yet, at such a pH, the nanoparticles of metal hexa- or octa-cyanometallate, for example of formula $[Alk^+_x]M^{n+}_y[M'(CN)_m]_t^{z-}$ discussed above, are not stable.

Therefore when such nanoparticles are used, one should place oneself at a higher pH of the aqueous phase of the emulsion, i.e. of the solution prepared in step c) generally close to 2 (for example from 1.5 to 2.5, notably from 1.8 to 2.2), and under these conditions, the addition of at least one metal fluoride such as NaF, is indispensable, otherwise during step d) the emulsion remains liquid, the sol-gel reaction never changes overtime towards the solid, and no monolith is obtained.

The solution of at least one metal fluoride, such as NaF, generally has a concentration from 1 to 40 g/L., for example 8 g/L.

The oily phase added during step d) is generally consisting of one or several linear or branched alkanes having from 7 to 22 carbon atoms such as dodecane and hexadecane.

The mechanical stirring carried out during step d) is generally achieved by using a device intended to emulsify, such as a disperser-homogenizer device of the Ultraturrax® type. Step d) may be described as an emulsification step of the system consisting of the solution obtained in step c) or step c1).

The mechanical stirring is a mechanical stirring under shearing.

The shear rate may range from 1 to 20,000 rpm, preferably from 2,000 to 15,000 rpm, still preferably the shear rate is of 3,200 rpm.

As this is shown in Example 2 (FIG. 3), it is possible to control the size of the macroporosity of the monoliths by acting on the shear rate of the emulsion. The size of the macroporosity decreases when the shear rate increases.

The volume fraction of the oily phase of the emulsion obtained during step d), is generally from 50% to 74%, preferably from 55% to 65% of the volume of the emulsion.

During step e), the ripening, mineralization of the emulsion obtained in step d) is carried out, whereby the monolith forms and the material according to the invention is obtained.

This step may be achieved by leaving the emulsion obtained in step d) at rest at a temperature from 10 to 60° C., for example at a temperature of 40° C. for a sufficient time so that the monolith forms a hierarchical porosity. This duration may be from 2 hours to 3 weeks for example, for example 7 days.

Generally at the end of step e), the material is washed and then dried.

The washing gives the possibility of removing the organic residues coming from the oily phase, which residues can be found essentially in the macropores.

This washing may be carried out with an organic solvent such as THF, acetone and mixtures thereof.

This washing may be achieved for a duration from 12 to 36 hours, for example 24 hours.

Preferably, this rinsing is carried out by refluxing the organic solvent.

The drying may be carried out by letting the organic solvent used for the washing evaporate at room temperature for a duration generally from 5 to 10 days, for example 7 days.

The drying may also be carried out by using a supercritical fluid, such as supercritical $CO_2$.

The material according to the invention, may notably be used but not exclusively, in a method for separating at least one metal cation from a liquid medium containing said metal cation, wherein said liquid medium is put into contact with the material according to the invention.

The materials according to the invention because of their excellent properties such as an excellent exchange capacity, an excellent selectivity, a high reaction rate, are particularly suitable for such a use.

This excellent efficiency is obtained with reduced amounts of metal cation exchange inorganic solid material such as an insoluble hexacyanoferrate.

Further, the excellent mechanical strength and mechanical stability properties of the material according to the invention, resulting from its specific structure allows its conditioning in a column and the continuous application of the separation method, which may thus be easily integrated into an existing facility, for example in a treatment chain or line comprising several steps.

Advantageously, said liquid medium may be an aqueous liquid medium, such as an aqueous solution.

Said liquid medium may be a process liquid or an industrial effluent.

Advantageously, said liquid medium may be selected from liquids and effluents from the nuclear industry and from nuclear facilities and from activities having radionuclides.

Generally, said cation may be present at a concentration of 0.1 picograms to 100 mg/L, preferably from 0.1 picogram to 10 mg/L.

The term of «metal» also covers the isotopes and notably the radioactive isotopes of said metal.

Preferably, the cation is a cation of an element selected from among Cs, Co, Ag, Ru, Fe and Tl and the isotopes, especially the radioactive isotopes thereof.

Still preferably, the cation is a cation of $^{134}$Cs or $^{137}$Cs.

This method has all the advantages intrinsically related to the material according to the invention, used in this method and which have already been described above.

BRIEF DESCRIPTION OF THE DRAWINGS

The scale indicated in FIG. 1 represents 20 nm.

The scale indicated in FIG. 2 represents 50 nm.

The scales indicated in FIG. 3 (A, B, C) represent 10 µm.

In ordinates is plotted I (in arbitrary units) and in abscissas is plotted 2θ (in °).

The points (○ and ●) relate to the monoliths prepared from a colloidal solution for which the nanoparticles concentration, [NP], in the colloidal suspension is of 9.0 g/L., and the points (□ and ■) relate to the monoliths prepared from a colloidal solution for which the concentration of nanoparticles, [NP], in the colloidal suspension is of 32.2 g/L.

In FIG. 8 the results obtained with massive ferrocyanides (■ and ■) are also plotted.

DETAILED DISCUSSION OF PARTICULAR EMBODIMENTS

The invention will now be described with reference to the following examples given as an illustration and not as a limitation.

EXAMPLES

In the following examples, silica monoliths are prepared containing ferrocyanides nanoparticles and these silica monoliths containing ferrocyanides are used as sorbents of cesium ion ($Cs^+$).

Example 1

In this example, the procedure for preparing silica monoliths containing ferrocyanide nanoparticles is disclosed.

The procedure for preparing silica monoliths containing ferrocyanide nanoparticles comprises the following successive steps:

1. Preparation of colloidal aqueous suspensions of nanoparticles (NP) of $[K_x]Cu_yFe(CN)_6$.

During this step, solutions, colloidal suspensions of nanoparticles (NP) of $[K_x]Cu_yFe(CN)_6$ wherein x ranges from 0.5 to 2.5 and y ranges from 0.5 to 2 are prepared.

The concentration of nanoparticles of these solutions, suspensions may range up to 50 g/L preferably up to 32 g/L.

More specifically, two solutions, colloidal suspensions were prepared with a view to their use in the examples which follow, i.e. a suspension with 9 g/L of $[K_{1.77}]Cu_{1.16}Fe(CN)_6$ and a suspension of 32 g/L of $[K_{2.07}]Cu_{1.08}Fe(CN)_6$.

To this end, a solution of $K_4Fe(CN)_6$ and a solution of $Cu(NO_3)_2$ are rapidly mixed.

The respective concentrations of $K_4Fe(CN)_6$ and $Cu(NO_3)_2$ in each of the solutions are $5.10^{-3}M$ and $3.9.10^{-3}M$ in order to obtain a suspension with 9 g/L of $[K_{1.77}]Cu_{1.16}Fe(CN)_6$ and of $1.5.10^{-2}M$ and $1.1.10^{-2}M$ for obtaining a suspension with 32 g/L of $[K_{2.07}]Cu_{1.08}Fe(CN)_6$.

The stoichiometry of the ferrocyanides was determined on the basis of ICP ("Inductively Coupled Plasma", inductive coupling plasma spectrometry) results.

The colloidal suspensions of ferrocyanide nanoparticles obtained are colored in red and are stable for months.

These suspensions are then used as a precursor of the final material, i.e. the silica monolith containing ferrocyanide nanoparticles.

The suspension used depends on the final concentration of nanoparticles (NP), desired in the final material.

The size of the NPs was determined by transmission electron microscopy (TEM).

Figure 1:
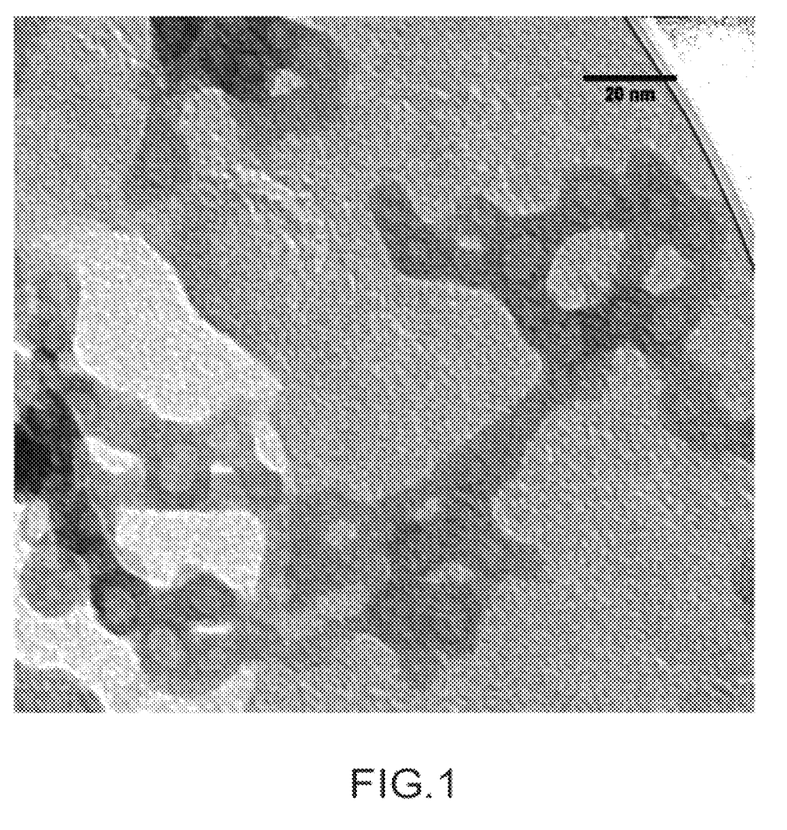
FIG. 1 is a photograph taken with a transmission electron microscope (TEM) of copper ferrocyanide nanoparticles which are found in a colloidal solution prepared like in step 1 of the procedure for preparing monoliths containing nanoparticles.
Figure 2:
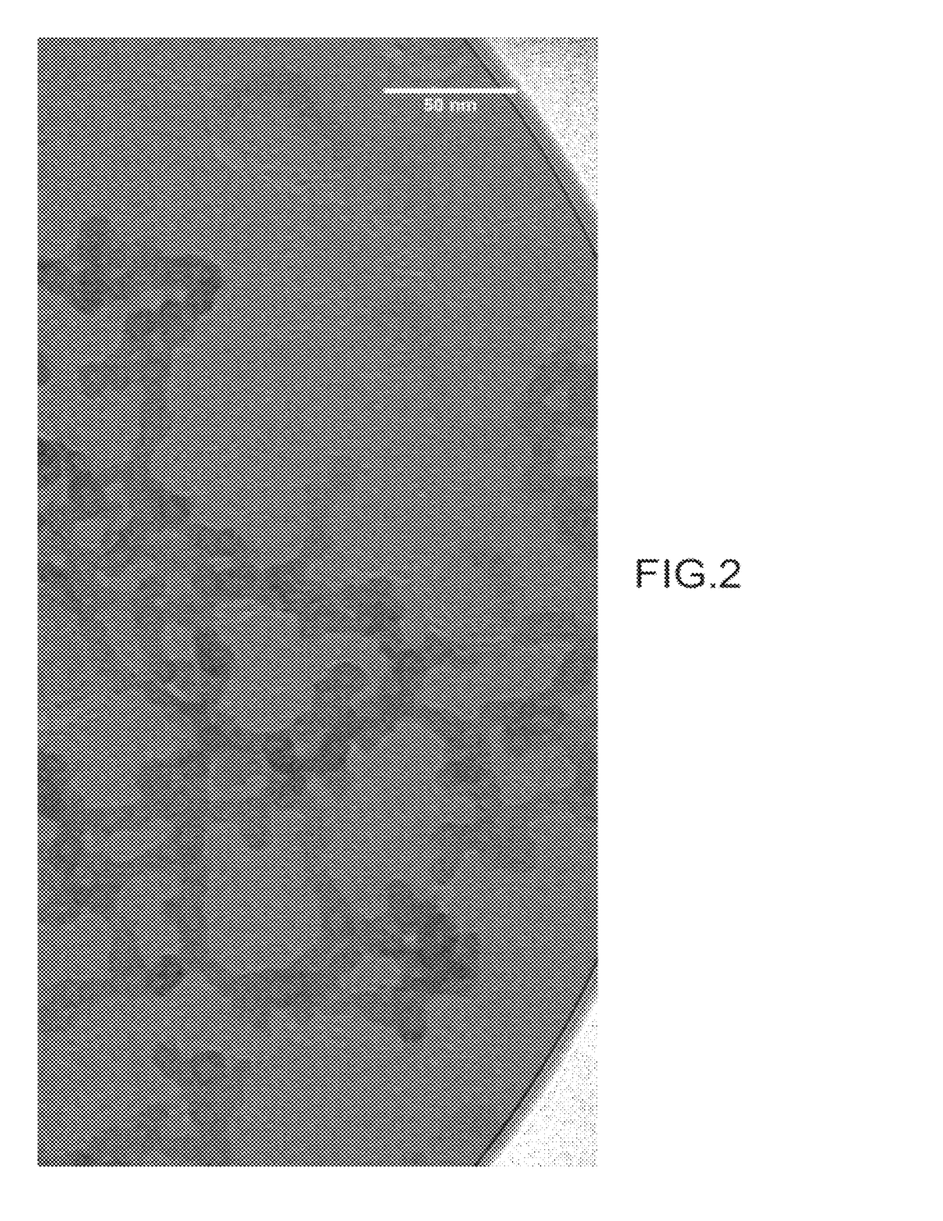
FIG. 2 is a photograph taken with a transmission electron microscope (TEM) of copper ferrocyanide nanoparticles which are found in a colloidal solution prepared like in step 1 of the procedure for preparing monoliths containing nanoparticles.

FIGS. 1 and 2 show photographs taken with a transmission electron microscope (TEM) of copper ferrocyanide nanoparticles prepared during this step: these are nanoparticles of $[K_{1.77}]Cu_{1.16}Fe(CN)_6$.

This preparation technique promotes the synthesis of not very monodispersed NPs with average sizes comprised between 10 and 20 nm.

The colloidal solution prepared in this step is called solution A.

2. Preparation of an aqueous solution of surfactant.

During this step, an aqueous solution with 20% by weight of Pluronic® P123 (surfactant marketed by BASF® or Sigma-Aldrich®) at pH=2, is prepared.

The surfactant solution prepared in this step is called solution B.

3. Preparation of a solution of a silica precursor containing a surfactant.

During this step, a given volume of solution B is sampled and a given volume of tetraethylorthosilicate (TEOS) is added slowly thereto.

One waits for 30 minutes until the solution again becomes clear.

The solution C is thereby obtained.

4. Preparation of an aqueous solution containing ferrocyanide nanoparticles, a silica precursor, and a surfactant.

During this step, a given volume of solution A is mixed with a given volume of solution C.

This mixing is carried out according to a ratio, a volume ratio R defined by the following relation:

$R=V$ colloidal suspension of nanoparticles/$V$ solution of $P123$ at 20% by weight and at a pH 2($V$ solution $A/V$ solution $C$)

This ratio, quotient R may vary between 0 and 2, preferably between 0 and 1. This mixture is called solution D.

5. During this step, a given volume of a solution of sodium fluoride (NaF) at 8 g/L is added into the solution D.

The solution E is thereby obtained.

6. Preparation of an emulsion from solution E.

Rapidly, i.e. within 15 minutes following the addition of the sodium fluoride solution having allowed preparation of the solution E, it is preceded with the emulsification of this solution with a given volume of dodecane ($C_{12}H_{26}$).

For this, a disperser-homogenizer device of the Ultraturrax® type is used and dodecane is added slowly into the solution E with shearing.

The shear rate may vary from 0 to 20,000 rpm, and preferably it is 3,200 rpm.

The volume ratios of each constituent used for preparing the emulsion are the following:

$V$ colloidal suspension of nanoparticles(solution/suspension $A$)+$V$ solution of $P123$ at 20% by weight and pH 2(solution $B$)/$V$ TEOS/$V$ Solution of NaF at 8 g/L/$V$ dodecane= 1.94/1/9.3.10$^{-3}$/4.75.

The emulsion F is thereby obtained.

7. Preparation of the monolith.

During this step, a so called ripening step, the monolith containing ferrocyanide nanoparticles is prepared.

For this, the solution F is placed in the oven at 40° C. for 7 days.

At the end of this ripening step, the monolith is formed.

There only remains washing, rinsing/drying steps to be carried out.

8. Washing the monolith.

During this step, the monolith is placed in a cartridge of a Soxhlet extractor and is rinsed for 24 h with refluxed tetrahydrofurane (THF).

9. Drying the monolith.

During this step, the THF is slowly evaporated at room temperature for 7 days. This drying step may also be carried out with the use of supercritical $CO_2$.

At the end of the drying step, a monolith is obtained, loaded with nanoparticles, ready-to-use.

Example 2

In this example, it is shown that it is possible to control the size of the macroporosity of silica monoliths by acting on the shear rate of the emulsion during step 6 for preparing the emulsion which precedes the step 7 for preparing the monoliths.

This preliminary study dealt with emulsions and materials not containing any nanoparticles.

The goal was to show that it was possible to synthesize silica monoliths for which the size of the macroporosity is controlled, by acting on the shear rate of the emulsion.

For this, several emulsions are prepared from a same solution E, in accordance with step 6, by achieving emulsification of this solution with a given volume of dodecane ($C_{12}H_{26}$).

The volume ratios of each constituent used for preparing the emulsion are the following: V solution P123 at 20% by weight and pH 2/V TEOS/$V_{NaF\_8g/L}$/V dodecane=1.94/1/9.3.10$^{-3}$/4.75.

In order to prepare the emulsions, a disperser-homogenizer device of the Ultraturrax® type is used and dodecane is slowly added into the solution E with shearing.

A first emulsion is prepared by using a shear rate of 13,000 rpm, a second emulsion is prepared by using a shear rate of 6,500 rpm, and a third emulsion is prepared by using a shear rate of 3.200 rpm.

A monolith is then prepared from each of the emulsions and then it is washed and dried in accordance with steps 7, 8, and 9.

Each of the thereby prepared monoliths are observed using a Scanning Electron Microscope (SEM).

Scanning electron microscopy allows determination of the statistical size of the macropores of the monolith, the final material.

Figure 3:
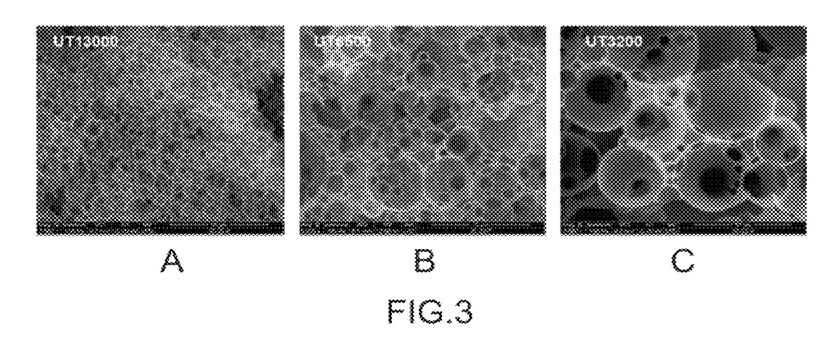
FIG. 3 (A, B, C) shows photographs taken with the scanning electron microscope (SEM) of silica monoliths prepared from emulsions prepared by respectively using a shear rate of 13,000 rpm, (A), a shear rate of 6,500 rpm, (B), and a shear rate of 3,200 rpm (C).

FIG. 3 (A, B, C) clearly shows the effect of the shear rate of the emulsion on the size of the macroporosity of the prepared monoliths. The size of the macroporosity decreases when the shear rate increases.

It is therefore possible to plot a sort of abacus giving the possibility of predicting the size of the macropores of the monolith according to the shear rate used during the preparation of the emulsion.

Figure 4:
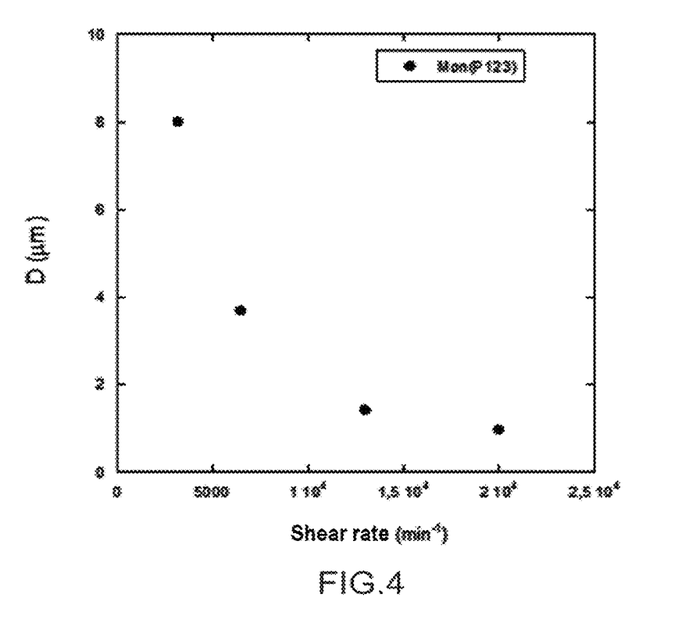
FIG. 4 is a graph which gives the average diameter D of the macropores of the monoliths (in µm), as a function of shear rate (in min$^{-1}$) used for preparing the emulsion having been used for preparing these monoliths.

FIG. 4 thus represents the average diameter of the macropores of the monolith depending on the shear rate.

Example 3

In this example, silica monoliths are prepared containing nanoparticles (NP) of ferrocyanides [K$_x$]Cu$_y$Fe(CN)$_6$ wherein x ranges from 0.5 to 2.5 and y ranges from 0.5 to 2.

In order to prepare these monoliths, the procedure described above is used, with concentrations of nanoparticles of the colloidal solution A (step 1 of the procedure) of 9 g/L or of 32 g/L, various volume ratios R (step 4 of the procedure) and a shear rate of 3,200 rpm during the preparation of the emulsion (step 6 of the procedure).

Table I hereafter, gives the NP concentrations of the colloidal solutions, the values of the volume ratios R, the theoretical and measured NP concentrations (by weight) of the monoliths, for the six prepared monoliths containing nanoparticles.

TABLE I

| Name | 0.21@3200 | 0.43@3200 | 0.77@3200 | 1.83@3200 | 2.86@3200 | 5.1@3200 |
| --- | --- | --- | --- | --- | --- | --- |
| Coll. Sol. | 9 g/l | 9 g/l | 9 g/l | 9 g/l | 32 g/l | 32 g/l |
| R | 0.07 | 0.11 | 0.24 | 0.64 | 0.24 | 0.64 |
| Theo. wt. % of NPs. | 0.3 | 0.6 | 1.2 | 2.5 | 4.4 | 8.4 |
| ICP wt. % of NPs | 0.21 | 0.43 | 0.77 | 1.83 | 2.86 | 5.1 |

The weight concentrations of NPs were determined by ICP/AES measurements after having dissolved the monoliths.

It is seen that these measured NP concentration values differ from the theoretical NP concentration values. This is due to the loss of a portion of the NPs during the steps for rinsing the monoliths.

The prepared monoliths all have a hierarchy of porosities with at the same time microporosity, mesoporosity and macroporosity.

Accordingly, the monoliths were also characterized by nitrogen adsorption-desorption measurements for determining their specific BET surface area ($S_{BET}$) as well as the size of the mesopores and of the macropores.

The results of these measurements are shown in Table II below.

TABLE II

| Name | 0.21@3200 | 0.43@3200 | 0.77@3200 | 1.83@3200 | 2.86@3200 | 5.1@3200 |
|---|---|---|---|---|---|---|
| $S_{BET}$ ($m^2/g$) | 290 | 278 | 383 | 479 | 547 | 643 |
| $D_{meso}$ (nm) | 2.6 | 2.7 | 2.7 | 2.7 | 3.1 | 6.2 |
| $D_{macro}$ (µm) | 4.2 | 4.1 | 4.3 | 8.6 | 5.7 | 5.1 |

A silica monolith was also prepared without any nanoparticles (0% NP).

Figure 5:
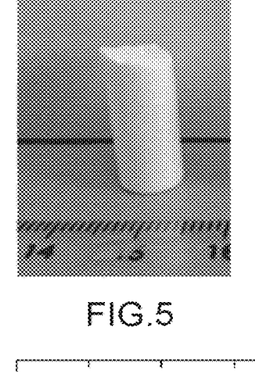
FIG. 5 is a photograph of a silica monolith which does not contain any nanoparticles (0% NP).
Figure 6:
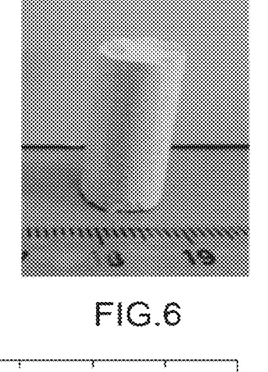
FIG. 6 is a photograph of a silica monolith containing 2.50% by weight of nanoparticles (called 2.50@3200; 3,200 being the shear rate).

Photographs of this monolith without any nanoparticles and of the monolith designated as 2.50@3200 are respectively shown in FIGS. 5 and 6.

Figure 7:
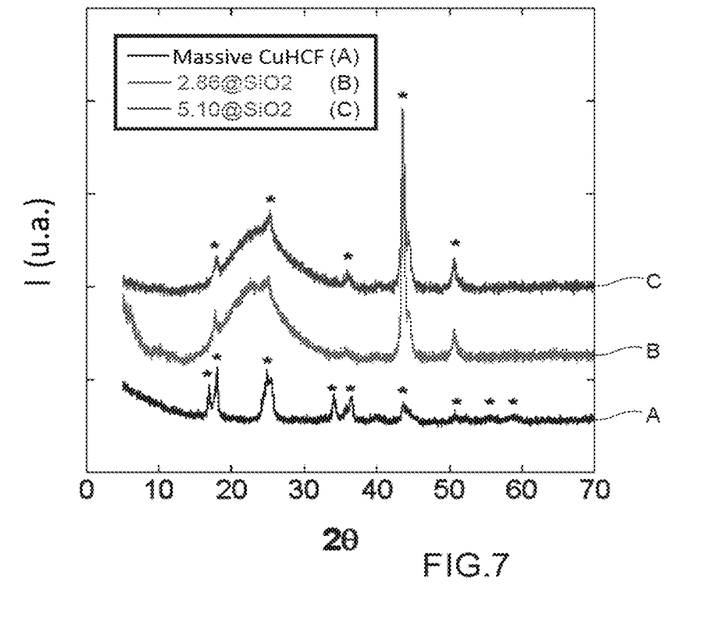
FIG. 7 is a graph which gives the X-ray diffraction spectra (XRD) of a massive (solid, bulky) block of particles of $K_{2.07}Cu_{1.08}Fe(CN)_6$(CuHCF)(curve A), and of monoliths containing these nanoparticles at different concentrations, i.e. the monoliths 2.86@3200(curve B); and 5.10@3200 (curve C).

X-ray diffraction analysis (XRD) are then conducted on a massive (bulky, solid) block of particles of $K_{2.07}Cu_{1.08}Fe(CN)_6$ (CuHCF), and of monoliths containing these nanoparticles at different concentrations, i.e. the monoliths 2.86@3200 and 5.10@3200, the XRD analysis results are shown in FIG. 7.

The XRD analysis gives the possibility of confirming that the structure of the NPs is actually that of a tetragonal structure of $K_2CuFe(CN)_6$.

The diffractograms relative to the monoliths show that the nanoparticles are inserted into the silica network (lattice) and that the structure is not modified very much.

Example 4

In this example, sorption tests of $Cs^+$ on silica monoliths containing ferrocyanide nanoparticles prepared in Example 3 or else on massive (bulky, solid) copper ferrocyanide are carried out.

The goal of these tests is therefore to compare the exchange capacity of the monoliths loaded with NPs with that of the corresponding massive copper ferrocyanide.

In these tests, the ferrocyanides are used as specific sorbents of cesium ion ($Cs^+$). Indeed, they contain a potassium ion in the crystalline unit cell which is specifically exchanged with a cesium ion.

The sorption tests summarized hereafter are conducted according to a standardized procedure.

This procedure comprises the following successive steps:
1. A solution containing $1.10^{-3}M$ of $CH_3COONa$ and $1.10^{-4}M$ of $CsNO_3$ is prepared. This solution is called solution G.
2. 10 mg of monolith are sampled, or else 10 mg of massive copper ferrocyanide, and they are immersed in 20 mL of the previous solution G.
3. Stirring is carried out for 24 h.
4. The supernatant is sampled, filtered and the Cs content is measured by ion chromatography.

This procedure gives the possibility of quantifying the exchange capacity of the monoliths while ensuring the selectivity of the materials for cesium as compared with sodium.

Figure 8:
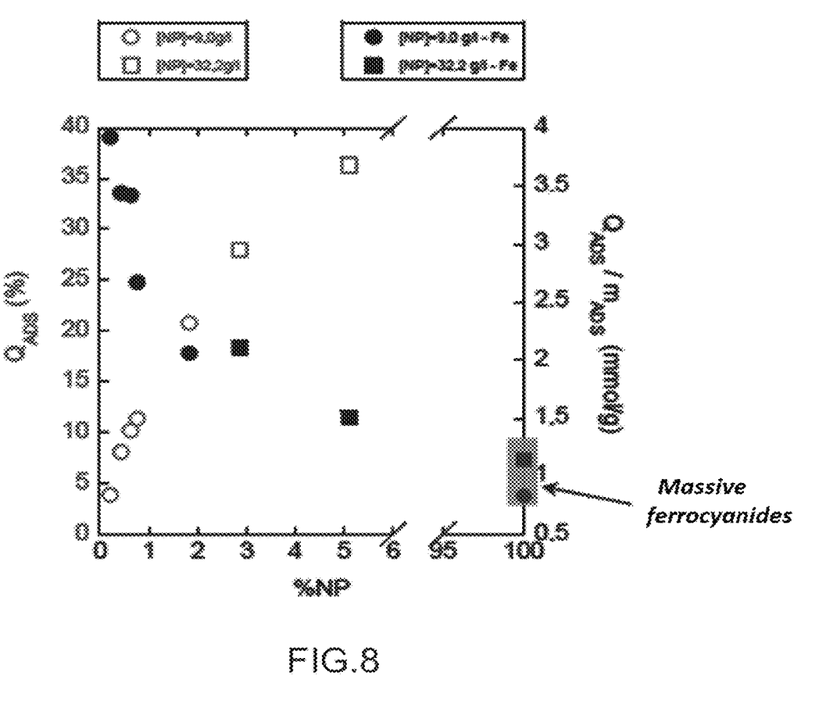
FIG. 8 is a graph which gives the total adsorbed amount of Cs ($Q_{ADS}$) (in %) (in ordinates on the left, points ○ and □), and the normalized adsorbed amount of Cs (in ordinates on the right, points ● and ■) which is the total adsorbed amount of Cs divided by the mass of adsorbent ($Q_{ADS}/m_{ADS}$) (in mmol/g), as a function of the mass fraction of nanoparticles in the monoliths.

In all the experiments for which the results are summarized in FIG. 8, the sodium concentration was identical before and after immersion of the material in the solution G.

After 24 h of stirring, the adsorption equilibrium is attained, which gives the possibility of comparing the experiments with each other.

FIG. 8 also shows the benefit of using NPs rather than a massive adsorbent. If the extracted amount of Cs is normalized by the mass of adsorbent present in the material, it appears that the materials less concentrated in NPs are the most efficient. This is explained by the fact that when the adsorbent is in a nanometric form, the specific surface area available for the cesium is higher. The increase in the NP mass fraction should promote their aggregation and the adsorption mechanism in the monolith then becomes increasingly similar to what is observed in the case of massive copper ferrocyanides. The observed deviation for both massive ferrocyanides is due to the elementary potassium proportions which are different in both cases.

In the case of the massive ferrocyanide from the colloidal solution at 32.2 g/L, there are on average 2.07 potassium atoms per mole while in the case of the one from the solution at 9.0 g/L, there are only 1.77 moles. The number of exchangeable potassium atoms with cesium is therefore different, which explains this deviation.

Example 5

In this example, sorption tests of $^{137}Cs^+$ are conducted on silica monoliths containing ferrocyanide nanoparticles prepared in Example 3, or else on massive (bulky, solid) copper ferrocyanide.

In the case of experiments conducted on radioactive Cs, the concentrations are much lower than in the case of non-radioactive Cs. The parameter allowing an estimation of the decontamination level of a radioactive solution by a sorbent material is then the distribution coefficient $K_d$. It is expressed in this way:

$$K_d = \frac{A_0 - A_{eq}}{A_{eq}} \frac{V}{m_{mat}}$$

With $K_d$ distribution coefficient (ml/g); $A_0$, initial activity of the solution to be decontaminated; $A_{eq}$ activity at equilibrium after 24 h of contact time; V volume of solution used to be decontaminated (ml); and $m_{mat}$ mass of sorbent material used (in g).

In order to evaluate the selectivity of the monoliths towards other cations competitors of Cs, a complex radioactive solution was prepared with the following composition:

$A_0 = 41.2$ kBq/L ([Cs]≈$10^{-10}$ mol/L)

[Na$^+$]=0.652 mol/L

[K$^+$]=0.0015 mol/L

[Mg$^{2+}$]=0.002 mol/L

[NO$_3^-$]=0.542 mol/L

[SO$_4^{2-}$]=0.008 mol/L

[PO$_4^{3-}$]=0.105 mol/L

The results are noted in the following table III:

TABLE III

| Sample | 0.21@3200 | 1.83@3200 | 5.10@3200 | Massive 32 g/L |
|---|---|---|---|---|
| $K_d$ (ml/g) | 2.4 $10^3$ | 3.0 $10^4$ | 1.1 $10^5$ | 3.1 $10^6$ |

The results show that the monoliths capture $^{137}$Cs in a very selective way as compared with the other cations competitors of Cs. The Kds are very high regardless of the NP concentrations of the ferrocyanides immobilized in the monoliths.

The efficiency of the monoliths is therefore validated on radioactive solutions representative of the solutions which have to be processed during a real accidental event, for example the effluents of the Daiichi Fukushima nuclear plant which contains sea water.

The invention claimed is:

1. A solid material in the form of an alveolar monolith comprising a matrix of an inorganic oxide with a hierarchical and opened porosity comprising macropores, mesopores, and micropores, wherein the macropores, mesopores, and micropores are interconnected, and wherein nanoparticles of at least one metal cation exchange inorganic solid material are distributed in the porosity.

2. The material according to claim 1, wherein the inorganic oxide is at least one oxide of at least one metal or metalloid selected from the group consisting of Si, Ti, Zr, Th, Nb, Ta, V, W, Y, Ca, Mg and Al.

3. The material according to claim 2, wherein the inorganic oxide is silica.

4. The material according to claim 1, wherein the metal cation exchange inorganic solid material is a metal hexa-cyanometallate or a metal octa-cyanometallate.

5. The material according to claim 1, wherein the nanoparticles have the shape of a sphere or of a spheroid.

6. The material according to claim 1, wherein the nanoparticles have an average size from 2 to 300 nm.

7. The material according to claim 1, wherein a content of the nanoparticles of the at least one metal cation exchange inorganic solid material is from 0.5 to 15% by weight.

8. The material according to claim 1, wherein the at least one metal cation exchange inorganic solid material is a metal hexa- or octa-cyanometallate of the following formula:

$[Alk^+_x]M^{n+}_y[M'(CN)_m]_t^{z-}$, wherein:
Alk is a monovalent cation selected from the group consisting of a cation of at least one alkali metal and the ammonium cation NH$_4^+$,
x is 0, 1, or 2,
M is a transition metal,
n is 2 or 3,
y is 1, 2, or 3,
M' is a transition metal,
m is 6 or 8,
z is 3 or 4, and
t is 1 or 2.

9. The material according to claim 8, wherein M$^{n+}$ is Fe$^{2+}$, Ni$^{2+}$, Fe$^{3+}$, Co$^{2+}$, Cu$^{2+}$, or Zn$^{2+}$.

10. The material according to claim 8, wherein M' is Fe$^{2+}$, Fe$^{3+}$, or Co$^{3+}$ and m is 6; or M' is Mo$^{5+}$ and m is 8.

11. The material according to claim 8, wherein $[M'(CN)_m]^{z-}$ is [Fe(CN)$_6$]$^{3-}$, [Fe(CN)$_6$]$^{4-}$, [Co(CN)$_6$]$^{3-}$ or [Mo(CN)$_8$]$^{3-}$.

12. The material according to claim 8, wherein the at least one metal cation exchange inorganic solid material is represented by the formula $[K^+_x]Cu^{2+}_y[Fe(CN)_6]^{z-}$.

13. The material according to claim 12, wherein the at least one metal cation exchange inorganic solid material is represented by the formula K$_2$CuFe(CN)$_6$.

14. A method for preparing the solid material according to claim 1, the method comprising:
(1) mixing a colloidal aqueous suspension of nanoparticles of at least one metal cation exchange inorganic solid material with an aqueous solution comprising an organic surfactant and a precursor of an inorganic oxide, to obtain an aqueous solution;
(2) adding an oily phase with mechanical stirring under shearing to the aqueous solution, thereby obtaining an oil-in-water emulsion formed with droplets of the oily phase dispersed in a continuous aqueous phase, wherein the nanoparticles of the at least one metal cation exchange inorganic solid material are present at the interface formed between the continuous aqueous phase and the droplets of the dispersed oily phase; and
(3) ripening and mineralizing the oil-in-water emulsion, thereby forming the alveolar monolith and obtaining the solid material.

15. The method according to claim 14, wherein, at the end of the mixing (1) and before the adding (2), when the at least one metal cation exchange inorganic solid material is a metal hexa- or octa-cyanometallate, a pH of the aqueous solution obtained in (1) is adjusted to the vicinity of 2, and (1') is additionally carried out during which an aqueous solution comprising at least a metal fluoride is added to the aqueous solution obtained in (1).

16. A method for separating at least one metal cation from a liquid medium comprising the at least one metal cation, the method comprising contacting the liquid medium with the solid material according to claim 1.

17. The method according to claim 16, wherein the liquid medium is an aqueous liquid medium.

18. The method according to claim 16, wherein the liquid medium is a liquid or effluent obtained from the nuclear industry, from nuclear facilities, or from activities using radionuclides.

19. The method according to claim 16, wherein the at least one metal cation is present at a concentration of 0.1 picogram to 100 mg/L.

20. The method according to claim 16, wherein the at least one metal cation is a cation of an element selected from the group consisting of Cs, Co, Ag, Ru, Fe, Tl and isotopes thereof.

21. The method according to claim 20, wherein the at least one metal cation is a $^{134}$Cs cation or $^{137}$Cs cation.

22. The method according to claim 20, wherein the isotopes are radioactive isotopes.

* * * * *